United States Patent [19]
Berglund et al.

[11] Patent Number: 6,044,411
[45] Date of Patent: Mar. 28, 2000

[54] METHOD AND APPARATUS FOR CORRELATING COMPUTER SYSTEM DEVICE PHYSICAL LOCATION WITH LOGICAL ADDRESS

[75] Inventors: Neil Clair Berglund, Kasson; Daniel Frank Moertl, Rochester; Gregory Michael Nordstrom, Oronoco; Thomas James Osten, Rochester, all of Minn.

[73] Assignee: International Business Machines Corporation, Armonk, N.Y.

[21] Appl. No.: 08/971,687

[22] Filed: Nov. 17, 1997

[51] Int. Cl.[7] ........................................ G06F 13/00
[52] U.S. Cl. .................... 710/9; 710/10; 710/104; 713/1
[58] Field of Search .................. 710/1, 2, 8, 3, 710/9, 10, 104; 713/1

[56] References Cited

U.S. PATENT DOCUMENTS

| | | | |
|---|---|---|---|
| 5,802,269 | 9/1998 | Poisner et al. | 395/183.2 |
| 5,802,393 | 9/1998 | Begun et al. | 395/830 |
| 5,809,224 | 9/1998 | Schultz et al. | 395/182.05 |
| 5,812,757 | 9/1998 | Okamoto et al. | 395/182.09 |
| 5,822,547 | 10/1998 | Boesch et al. | 710/103 |

OTHER PUBLICATIONS

Technology Brief, Where Do I Plug The Cable? Solving The Logical–Physical Slot Numbering Problem; Compaq Computer Corporation; Dec. 1996 –209A/1296.

SES SCSI Enclosure Services, X3T10/Project 1212–D/REV 8a, Jan. 18, 1997.

*Primary Examiner*—Xuan M. Thai
*Attorney, Agent, or Firm*—Christopher H. Lynt; Matthew J. Bussan

[57] ABSTRACT

In an electronic system having at least one enclosure including at least one connecting board with at least one associated device coupled thereto, a respective physical location of each device is electronically determined, and an indication of each respective physical location is stored in memory disposed in the at least one enclosure. An operating system uses the stored physical location indication to correlate logical addresses to physical location.

28 Claims, 11 Drawing Sheets

NVRAM

| Manufacturing 128 bytes | | |
|---|---|---|
| CCIN (Type Number) | 4 bytes | of backplane |
| Status (Model Number) | 4 bytes | of backplane |
| Part Number | 12 bytes | part# of backplane |
| RSVD (Serial Number) | 8 bytes | No gang burning of eeprom can be done. Serial number added where Asset protection or other compelling tracking is anticipated (ie new highly unstable components...failure tracking. Fill with FFHex. |
| MFG ID | 4 bytes | |
| Frame ID | 1 byte | These 2 bytes written only in systems that do not have the SPCN I2C connection. Systems with the SPCN I2C connection write these bytes during IPL always will check for non-zero Frame/Backplane entries and use those as the defaults. The nvram bytes stored here will be ignored in those systems. These 2 bytes can be 'burned' by Manufacturing at the component level or by IDE programs at a system level. |
| Backplane ID | 1 byte | |
| Slot Count | 1 byte | how many to look for since >16 slots might exist |

| A | | |
|---|---|---|
| Slot Map | 16"5bytes | Bytes 4,3,2 are alphanumeric and match the 'stenciled'pci slot labeling. Byte 1=primary bus device.function. Byte 0 =secondary bus device.function. These 5 bytes repeated 16 times. One 256byte eeprom allows 16 pci card slots per host bridge. A bigger eeprom is needed for backplanes with more than 16 slots under one host bridge. Fill empty 5 byte sections with FF Hex. This slot map can be 'burned' at the component level or by IDE programs at a system level. |
| Config Bits | 1 byte | RSVD to differentiate systems where identical backplane used |
| RSVD | 12 bytes | fill with FFHex |
| OPSYS 128 bytes | | |
| System Serial Number | 10 bytes | XM chk/update on each ipl |
| assigned backplane serial | 6 bytes | |
| Primary Bus Logical Bus Number | 2 bytes | |
| Primary Bus Physical Number | 4 bytes 10 bytes | fill with FFHex |
| Sub Bus Logical Bus Number | 2"16 bytes | |
| Sub Bus Card Number | 2"16 bytes | |
| RSVD | 32 bytes | fill with FFHex |

METHOD AND APPARATUS FOR CORRELATING COMPUTER SYSTEM DEVICE PHYSICAL LOCATION WITH LOGICAL ADDRESS

BACKGROUND OF THE INVENTION

Field of The Invention

The invention relates to the field of computer systems management, and in particular, to a method and apparatus for correlating the physical locations of system components with their corresponding logical addresses.

BACKGROUND INFORMATION

In electronic systems, such as the typical desktop personal computer systems, it is known to store certain basic system information in non-volatile memory which is commonly referred to as SRAM (static random access memory) or CMOS, because it is generally memory formed with complimentary metal oxide semiconductor technology. Of course, this type of memory is only "non-volatile" as long as a voltage is applied to it, either from the computer system power supply or from an onboard battery when the computer system is powered down. The information stored in CMOS includes hardware information, for example, system memory size, hard disk drive type and other peripheral device information. This information is sometimes manually entered by the computer manufacturer at the time the system is configured, or by a user when the system is upgraded by adding a new component. The information stored in CMOS memory is used by the computer's basic input output system (BIOS), which is a set of routines generally stored as firmware in read only memory (ROM) disposed on the computer system mother board, to establish parameters for communication between the computer system hardware, including peripheral devices, and the operating system software. Some BIOS versions have an automatic detect feature to detect a device's parameters. For example, when a new hard drive is added to the system, the user can manually configure the required parameters to be stored in CMOS memory, or the user can have the BIOS automatically detect the drive type, number of cylinders, heads, etc., of the new hard drive, for storage in CMOS. Further, some recent computer systems use what is called a "plug-and-play" (PnP) BIOS, in which the BIOS automatically detects the installation of a new device having PnP compatibility, and configures the necessary input/output parameters for the device. However, in this known method, the BIOS and operating system only know the device by its logical address, and not its actual physical location. That is, it is not readily apparent to the user or service personnel from the BIOS or operating system, to which card slot on the mother board a device is physically connected. In small desktop computer systems this is not generally a concern since the number of peripherals such systems can accommodate is usually relatively small.

Typical medium to large size computer systems include at least one backplane, which is essentially a connecting board having integrated wiring and bus slots or other connectors, for interconnecting various computer system circuits designed to connect to the backplane. The backplanes connect circuits such as special purpose input-output and/or control circuits, for use in interfacing peripheral devices, for example, such as direct access storage devices (DASD's, e.g., hard disk drives), to the rest of the computer system. These circuits are generally disposed on modules or cards which have standard connectors for plug-in to a backplane at bus sockets or slots, to thereby connect with the rest of the computer system by way of the backplane. This allows for easy removal, servicing, upgrading and replacement by service personnel and/or experienced users.

In the case of a DASD, an interface circuit card may be used to couple a DASD parallel or serial input/output bus to the computer system bus via the backplane. In some systems, there may be one or more dedicated backplanes designed and used for DASD interfacing, and these are referred to herein as DASD backplanes.

There are also a variety of standard bus types and associated slot connectors in current use in computer system backplanes, including ISA (Industry Standard Architecture—8/16 bits) and EISA (Expanded ISA—32 bits), SCSI (Small Computer System Interconnect), PCI (Peripheral Component Interconnect), MCA (Micro Channel Architecture), VLB (VESA Local Bus), AGP (Accelerated Graphics Port), and bus standards being planned for use, e.g., USB (Universal System Bus), to name just a few. A backplane may be dedicated to one bus standard, or have several standard buses and slot connectors thereon. A popular bus type currently is the PCI bus, and where a backplane includes primarily PCI type bus connections, it will be referred to herein as a PCI backplane.

Each device connected to the computer system through one of these buses/slots is given a logical address which is used by the operating system to identify the device, and to route signals to and from the device, i.e., "talk" to the device. Moreover, special purpose circuitry is often used to control and interface the bus to the peripheral devices, and to the rest of the computer system.

If a peripheral device, for example a DASD, is operating at a substandard level, the computer operating system should detect and indicate such to a user of the system to alert service personnel. In the case of a failed hard drive, the system might report "error reading drive X" (where "X" is the logical drive name) on the display console of the system, for example. In small desk-top computer systems, when such an error is reported, it is generally relatively easy for service personnel to locate the hard drive in question, and the related interface card device, since there is only one enclosure and typically only one or two hard drives provided. With larger and more complex computer systems, such as servers for small and large office environments, typically more peripheral devices, hard drives, and associated backplanes and interface cards are used, and they may be disposed in separate enclosures, also called "frames" or "towers," forming an interconnected multi-tower system. In such systems, locating a device in need of servicing may be more difficult and/or time consuming, unless the operating system can indicate the location of the device in question by tower, backplane, and card-slot, for example.

One computer system that is sometimes configured as a multi-tower computer system is the IBM AS/400 (IBM and AS/400 are registered trademarks of International Business Machines Corporation). The towers of this computer system in its multi-tower configuration are interconnected by at least one host system bus, but are also interconnected by a communications network called the system power control network (SPCN). The SPCN is a low volume serial network which has been used to monitor power and cooling conditions at the towers of the computer system. The nodes in the SPCN network typically include a microprocessor and related circuitry which monitors the status of, and makes occasional adjustments to, the power and/or cooling conditions at the respective tower. These and related functions are sometimes referred to as "enclosure services." For simplicity, a node processor and its related circuitry will be simply referred to as a "node" herein. A primary tower of the computer system contains a central electronics complex (CEC) with the network "master" processor, as well as the computer system CPU running the operating system. A network of this type is the subject matter of U.S. Pat. No. 5,117,430, and an enhanced network is the subject matter of copending application RO997-083-IBM-101 (Ser. No. 08/912,561).

In such a multi-tower system, locating an actual physical device that corresponds to a "logical" device which the operating system has reported is in need of service or replacement, for example, could be very time consuming for service personnel if the operating system could not indicate the actual device location. Therefore, during initialization of the computer system, the tower in which each device is located must be electronically determined, as well as the backplane to which it is interfaced and the slot on the backplane, in order for service personnel to readily correct a problem.

Even in a single tower system which does not use SPCN, there may be a number of backplanes, each with a number of slots, making physically locating a particular "logical" device difficult and/or time consuming without first establishing a logical to physical location correlation.

During initialization of the computer system (Initial Program Load), the operating system establishes the logical address for each device in the system. However, these logical addresses do not necessarily indicate in any readily discernible way the actual physical location of the devices. Therefore, when the operating system reports that a logical device requires service, the exact physical location of the hardware associated with this logical device, e.g., the particular card plugged into a particular slot on a particular backplane in a particular tower, must also be somehow known and indicated. Special routines may be used to pinpoint the physical location of each device in the system and correlate it with the logical device.

Computer systems having SPCN have used a "round-robin" approach for correlating physical location to logical address, in towers where peripheral I/O (input/output) subsystems reside, for example. In this approach, the host system bus electrically raises a flag in an I/O subsystem that SPCN will search for and recognize. After recognizing the flag, SPCN responds to the operating system which generated the flag, saying "I got it!" The operating system will then continue this technique on all possible subsystems and buses in a round robin fashion until finished. However, as can be appreciated, this method is relatively slow and can tie up the operating system for considerable amounts of time. Further, the operating system has to be completely or nearly completely initialized before beginning the question and answer polling. Further, if the system is reconfigured by removing and replacing or upgrading a tower, for example, the time-consuming round robin polling may need to be performed again to reestablish a logical to physical correlation.

There has been proposed a solution to identifying the physical location of a specific PCI device in a "TECHNOLOGY BRIEF" from Compaq Computer Corporation entitled "Where Do I Plug the Cable?" (December 1996—209A/1296). The solution relates to providing slot numbers in the PCI BIOS IRQ (interrupt request) table and providing chassis numbers and expansion registers in PCI-to-PCI bridge implementations. However, the proposal has a number of drawbacks and limitations which make it less than optimal in many circumstances. For example, should the functional path to the bridge registers fail, the slot and chassis numbers would be inaccessible. The proposal further does not provide a method of backplane identification.

In the case of SCSI services, the American National Standard for Information Systems (ANSI) has proposed a model (SES) for SCSI access to services (power, cooling, indicators, etc.) within an enclosure containing one or more SCSI devices (e.g., direct access storage devices) (see the working draft entitled "SES SCSI Enclosure Services," X3T10/Project 1212-d/Rev 8a, Jan. 18, 1997). However, the ANSI-SES specifies that the SCSI bus must download enclosure information and services to an SES processor. The drawbacks to this implementation include, again, if the functional SCSI device interconnect path has failed, no enclosure information can be obtained. Also, by itself, there is no way to differentiate between SES processors and assign each a unique physical address within a system unless the SCSI adapter is housed in the same physical enclosure as the DASD.

Therefore, a need exists for a more complete, efficient and flexible way to correlate physical location to logical address to enhance serviceability.

SUMMARY OF THE INVENTION

It is, therefore, a principle object of this invention to provide a method and apparatus for correlating physical location to logical address.

It is another object of the invention to provide a method and apparatus that solves the above mentioned problems so that a physical device corresponding to a logical device can be readily located.

These and other objects of the present invention are accomplished by the method and apparatus disclosed herein.

According to an aspect of the invention, a system power control network node connection is provided to each backplane in each enclosure of a multi-enclosure system through which the system power control network will, upon initialization, write a unique physical location indication, e.g., enclosure (frame or tower) number and backplane number, into memory disposed on each backplane. Non-volatile memory on the backplane may contain pre-stored slot location information, e.g., slot number. The operating system can build its logical to physical mapping of the backplanes by reading through a host system bus the unique enclosure and backplane address stored by the system power control network in memory, and the slot location information stored in non-volatile memory, on each backplane, and establish a correlation of the logical devices to their physical location.

According to an aspect of the invention, backplanes containing peripheral component interconnect (PCI) type buses will have their PCI bridge circuit or circuits connected to the system power control network node in their respective enclosure. The PCI bridge circuit is provided with memory for storing the enclosure and backplane location information, and is coupled to non-volatile memory holding slot location information, and to the operating system host bus for providing the enclosure, backplane and slot location information to the operating system.

According to another aspect of the invention, for direct access storage device backplanes, the associated system power control network node is advantageously coupled to an associated system enclosure service processor memory into which the system power control network will write the enclosure and backplane location information. The operating system will access the location information through the system enclosure services processor.

According to another aspect of the invention, local storage of physical location information is provided, and this information is accessible through the host operating system to build a logical to physical correlation.

According to another aspect of the invention, there is provided a mechanism through which the location information can be written into local storage without burdening the operating system. The local storage can include storage associated with a local operator panel display, also referred to as a local operator attention display.

According to another aspect of the invention, the mechanism through which the location information can be written into local storage is the system power control network.

According to another aspect of the invention, redundant paths to the location information storage are provided, through the system power control network and through the host system bus.

According an aspect of the invention, there is provided prestored physical location information in non-volatile memory, and this information is accessible through the host operating system to build the logical to physical correlation.

These and other aspects of the invention will become apparent from the detailed description set forth below.

BRIEF DESCRIPTION OF THE DRAWINGS

FIG. 5 illustrates an exemplary format for storing location information in memory according to the invention.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Figure 1A:
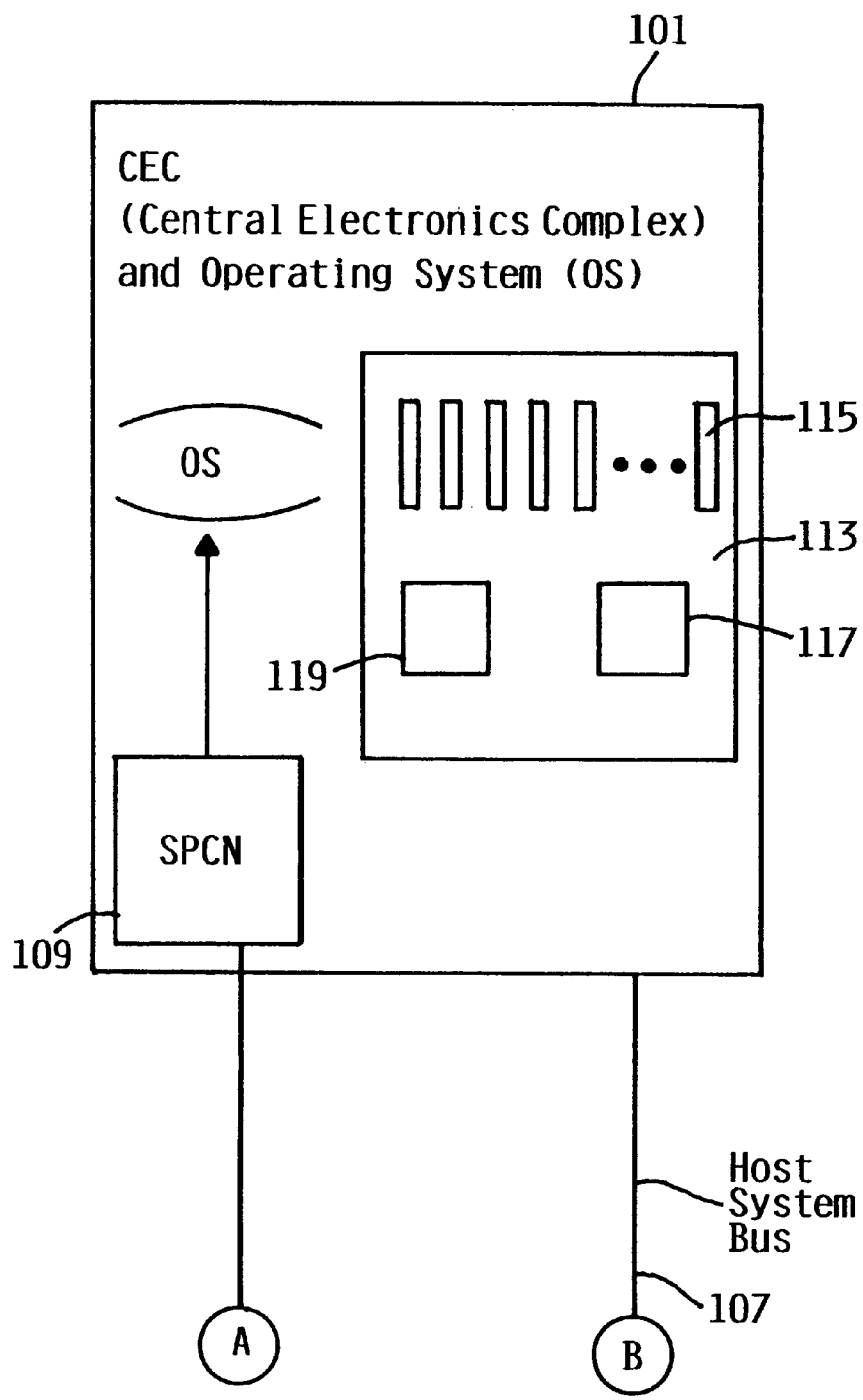
FIG. 1 illustrates a PCI backplane system according to an exemplary embodiment of the present invention.
Figure 1B:
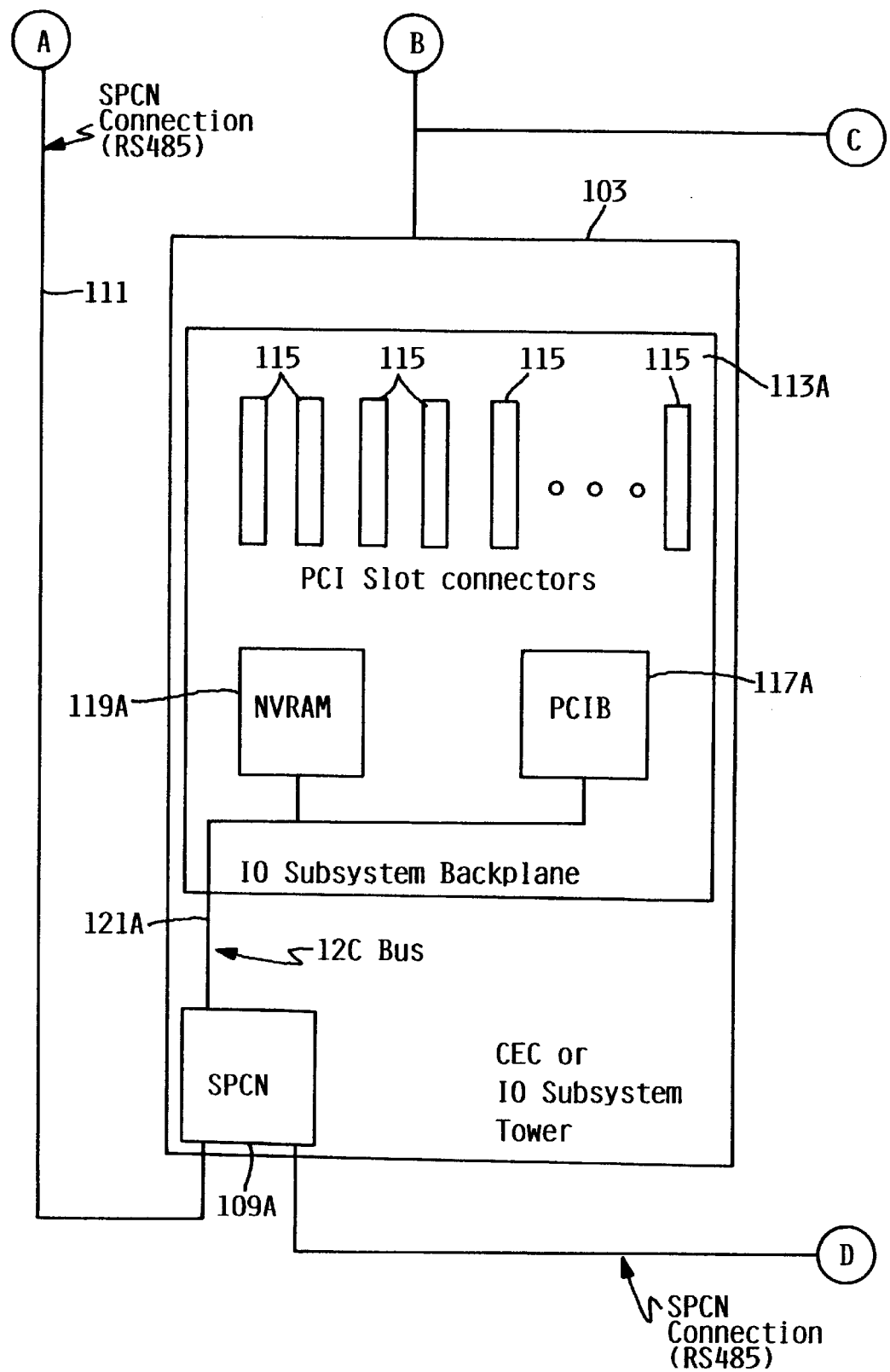
Figure 1C:
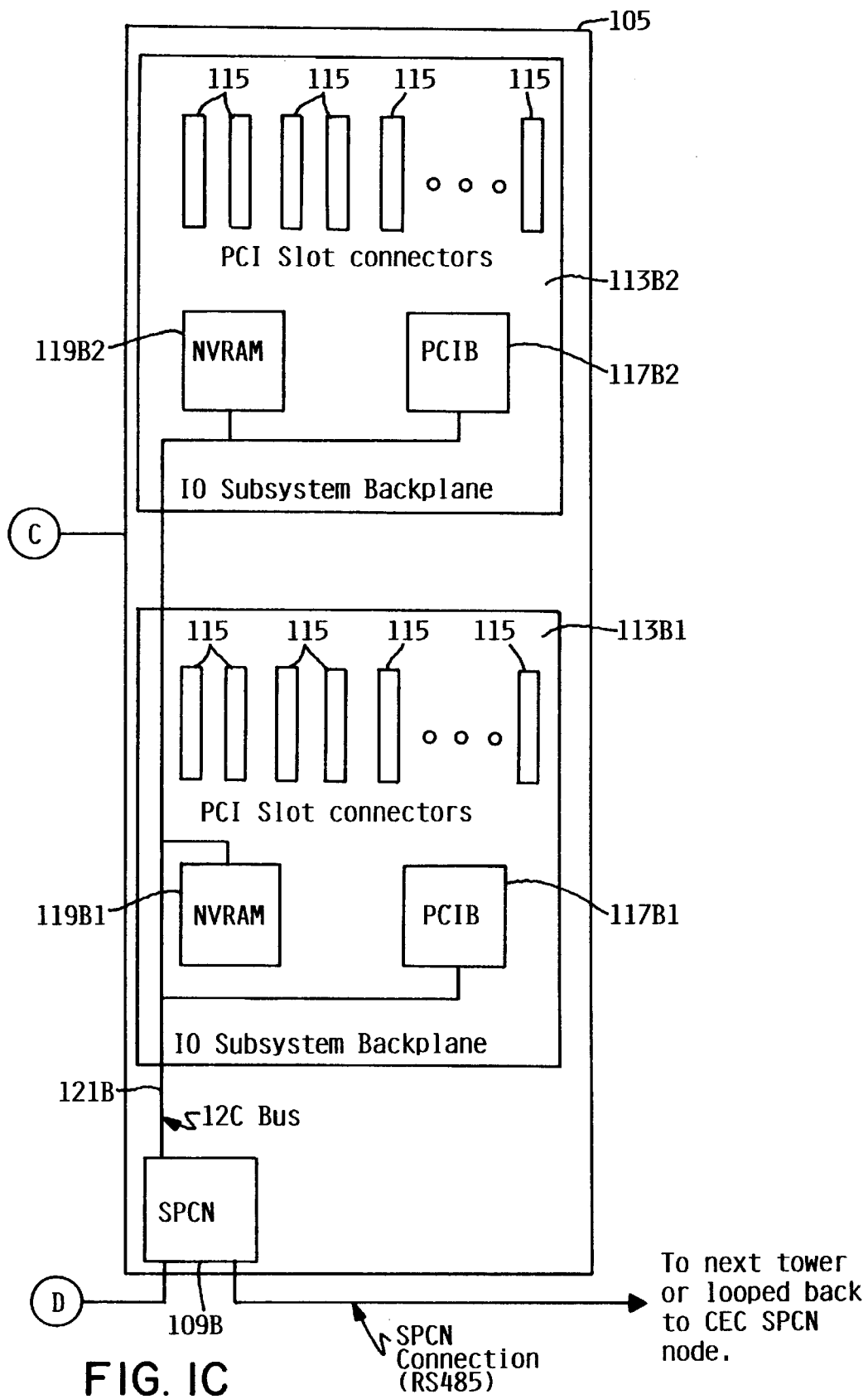

The invention is described by way of a computer system utilizing an exemplary embodiment of the present invention. FIG. 1 illustrates a first backplane system according to an exemplary embodiment of the present invention. In the FIG. 1 system, a central electronics complex (CEC) and operating system (OS) in a first enclosure 101 is connected to two other enclosures 103 and 105 by a host system bus 107. The host system bus 107 could be a PCI bus, or another type of parallel or serial bus having predefined bus drops provided at each enclosure, for example.

The system also has a system power control network (SPCN) including a primary SPCN node 109 in the CEC/OS enclosure 101, and secondary nodes 109A and 109B in the other enclosures 103 and 105, respectively, interconnected by a communication line 111, e.g., an RS-b 485line. Other enclosures may be present in the SPCN network, but are not shown in order to simplify illustration and description. The network connection illustrated is a single chain from the primary CEC enclosure 101 to the other enclosures 103 and 105. However, the SPCN network could also be in the form of two chains with the CEC enclosure 101 at the hub, or in a loop form, within the sprit of the invention.

The CEC enclosure 101 has one or more backplanes, and one backplane 113 is illustrated. The backplane 113 in the illustrated embodiment is a peripheral component interconnect (PCI) backplane having a number of slot connectors 115 coupled to at least one local PCI bus (not shown). The term "local PCI bus" is used to designate a PCI bus integrated on the backplane. A PCI bridge circuit 117 is provided to couple the local PCI bus slot connectors 115 to the host bus 107 and to other local PCI buses/slots (not shown in this figure) if applicable, thereby "bridging" the buses. There may be, for example, eight PCI slots 115 on one local PCI bus serviced by the bridge circuit 117, however the invention is not limited to any particular number.

The backplane 113 also has non-volatile random access memory (NVRAM) 119 on-board. This memory 119 is used in an embodiment of the invention for storing slot information used to correlate physical location to logical address, as will be explained in more detail later with respect to the other enclosures 103,105.

Each of the enclosures 103, 105 also contain at least one respective backplane. Enclosure 103 has one backplane 113A, with slots 115, bridge circuitry 117A, and NVRAM 119A. Coupling the SPCN node 109A to the bridge circuit 117A, and the bridge circuit 117A to the NVRAM 119A, is a local bus 121A, which may be, for example, an I2C standard serial bus. Other buses could be used within the spirit of the invention, depending on the type of memory circuits (NVRAM) used. In a preferred implementation, the bridge circuit 117A has two bus ports, one to the SPCN node 109A and one to the NVRAM 119A, besides, of course, the PCI bus connections on the backplane 113A which are not shown to simplify illustration and description. However, one skilled in the art would recognize that one bus port could be used to connect both to the SPCN node 109A and the NVRAM 119A within the spirit of the invention. The backplane 113A may be for connection to input/output (I/O) subsystems, for example. The bridge circuit 117A includes random access memory (RAM) associated therewith which can be used, along with the NVRAM 119A for storing location information according to the invention, i.e., a physical location indication such as enclosure number and backplane number.

Enclosure 105 is illustrated as having two interconnected PCI backplanes 113B1 and 113B2, interconnected to each other and to SPCN by local bus 121B. Each backplane 113B1 and 113B2 has a respective bridge circuit 117B1 and 117B2, and NVRAM 119B1 and 119B2. Typically, one PCI backplane bridge circuit (e.g., 117B1) acts as a "host" bridge (HB), with up to eight "secondary local" bridge circuits (e.g., 117B2). In this way, sixty four PCI slots are provided for, eight slots off the host, and seven each off each of the eight secondaries. This is a typical configuration, however the invention is not limited to any particular number of slots and/or backplanes.

As mentioned at the outset, physical location information is required by service personnel in order to quickly and efficiently locate components in need of service, replacement or upgrading, for example. Logical addressing used by the operating system is generally not sufficient to serve this requirement. The CEC 101, and each other enclosure 103, 105, may include a local operator panel display, also referred to as a local operator attention display (not illustrated). On this panel error information, for example, is displayed to alert service personnel. According to an embodiment of the invention, along with an error message there may be displayed the physical location information of the component associated with the error. In this way, the service personnel can quickly correct the problem. Establishment of the physical location to logical address correlation in an exemplary embodiment will now be described.

In an exemplary operation, when the system is turned on, and initialization begins, the SPCN establishes a configuration map of all system enclosures (also called frames or towers) connected to the network, and then writes a system wide unique address into local memory at each backplane, e.g., the memory associated with the bridge circuits. The SPCN network writes unique physical location addresses into the respective memory, specifying the associated enclosure (tower/frame) and the particular backplane. Each slot 115 on one of the backplanes 113A, 113B1, 113B2 has a unique location address on that backplane under the PCI regime, e.g., slots 1 to 8, based on relative physical location (e.g., left to right), and this information has been prewritten into the NVRAM in this embodiment during manufacture of the backplane. The PCI bus address, plus the board address, plus the card address uniquely define a backplane slot number. The physical address maps directly to a logical address comprised of a function number and IDSEL# line which are physically identifiable components on any given PCI backplane. Where there is more than one bridge circuit on a backplane, there may be provided an NVRAM for each bridge circuit to contain the slot information for slots associated therewith. During manufacture, the assigned slot numbers as stored in NVRAM may be stenciled onto the slots so that they are easy to locate by service personnel. Of course, where space does not permit stenciling, the service manual photograph of the backplane would be numbered with the associated slot numbers.

Prior to IPL (initial program load), the SPCN goes sequentially down the network defining a unique enclosure (tower/frame) address, and further goes sequentially through the backplanes defining a unique backplane address within each enclosure, and writes the electronically determined addresses, i.e., enclosure (frame/tower) and backplane, into an associated memory at the associated bridge circuit. Each backplane therefore has its unique physical location address stored in local memory thereon.

During IPL, the operating system builds its logical mapping of the entire computer system by "walking its buses." The operating system will read the enclosure/backplane physical location address information stored (by SPCN) in memory at the bridge circuits 117, and the card/slot information in NVRAM, via the host system (e.g., PCI) bus 107, and build a mapping of logical address to physical location address for each backplane. In this way, the operating system does not have to go through the time consuming polling operation described with respect to prior systems. The physical location information is instantly available to the operating system when the logical addresses are assigned thereby. The NVRAM already contains the physical location information which can be read by the operating system through the primary functional path, i.e., the system bus. Further, SPCN provides a redundant path to the information which can be advantageous should there be a failure somewhere in the primary functional path preventing access to the physical location information.

SPCN does not connect directly to the NVRAM in this illustrated embodiment, but rather connects to the bridge circuit through a point-to-point 12C bus, the bridge circuit in turn connecting to the NVRAM to obtain the slot location information. However, other designs are possible within the spirit of the invention. The two backplane bridge circuits 117B1, 117B2 could be connected to their respective NVRAMs on the same local 12C bus 121B, or on separate 12C buses to the SPCN node. If on the same bus, the operating system and hardware designs must make sure that both bridge circuits did not try to access their NVRAM at the same time.

Alternately, the enclosure/backplane location information could be written into the NVRAM itself, to be stored along with the pre-stored slot information. Advantageously, because of the writing of the physical location into NVRAM, if a device error is reported prior to a reconfiguration of the system during concurrent maintenance (CM), for example, the device may still be located by its reported physical location, even though its logical address may have changed.

Another alternative could be to use the host bus hardwired arbitration lines as a composite of the slot number rather than to require an NVRAM associated with every single host bus per backplane. However, some host buses may not be configured with such hardwired arbitration lines, and therefore using NVRAM provides a more flexible and robust approach. It may be advantageous and desirable for the operating system and/or the system power control network to use the NVRAM for other information as well, for example, vital product data (VPD), such as the type of FRU (field replaceable unit), the model number, etc., as will be described in more detail later. Conceptually, and for the purposes of this disclosure, various input/output devices, adapter cards, direct access storage devices, and backplanes can all be considered "field replaceable units" (FRUs) since they are all units which can be serviced and/or replaced in the field. The VPD which may be stored in the memory, therefore, can relate to the backplane, any adapter card, or any input/output or storage device coupled thereto.

In some systems, such as those having multiple buses, it is very advantageous to store bus identification information in non-volatile memory (NVRAM) associated with the backplane. In this way, should an enclosure be removed and relocated at a different position on a main bus, that is, be at a different logical bus "drop" point, a unique bus identifier persists in the NVRAM, so that system bus configuration information can be maintained and updated in the operating system and NVRAM. In such an arrangement, then, every system bus has an associated NVRAM providing the information.

The preferred embodiment described above uses the bridge ports as interface circuitry for the SPCN node and the NVRAM. This may be desirable and advantageous because in this way SPCN does not require special addressing and protocol for accessing the NVRAM directly. However, in other situations, it may be desirable to have the system power control network node, or its equivalent, coupled directly to the NVRAM, eliminating one port on the bridge circuit.

One underlying concept is that there is some local storage of physical location information, and that this information is accessible through the host operating system to build a logical to physical correlation. Another underlying concept is that there is a mechanism through which the enclosure/backplane information can be written into local storage without burdening the operating system. In the above described embodiment, this mechanism is the SPCN, however, other mechanism could be used within the spirit of the invention.

Another underlying concept that goes together with the latter, is that there is a redundant path to the location information storage, i.e., in the above described embodiment, through the SPCN and the host system bus. One skilled in the art would recognize that there could be many and varied ways of implementing these underlying inventive concepts, and these would be considered to be within the scope of the invention defined herein.

As mentioned above, some computer system configurations only have one enclosure, and therefore, may not use SPCN. In such a system, at power-on or reset, a PROM (programmable read only memory) interface would cause the bridge circuit memory, or NVRAM, to be written with enclosure/backplane/slot information. The PROM here is performing the function of the SPCN in the multi-tower embodiment. The bridge circuit subsequently provides this enclosure/backplane/slot information to the operating system through the host PCI bus connection. Of course, such an embodiment would generally only be useful in a system with a fixed configuration.

Another alternative simply uses defaults in the bridge circuit and NVRAM to indicate the logical to physical mapping. When the defaults are read, they indicate to the operating system that this is the one and only backplane, for example.

An advantage of using NVRAM is that, when installed on a particular PCI backplane, besides being written with slot information, the NVRAM can be written with VPD product information, such as the type of backplane, manufacture date, backplane serial number, type of slots on the backplane, etc., and this information will be retained for use by the operating system if and when needed for service action, upgrades, or for on-line configuration management and order process.

The above described embodiments envision using non-volatile random access memory (NVRAM) for storing at least the slot information, however the invention is not limited to using any particular type of non-volatile memory. For example, CMOS memory, various types of programmable read only memories (PROMs), or so-called Flash memory could be used as the non-volatile memory. Further, for computer systems where the system configuration will not change, all of the physical location information, i.e., enclosure/backplane/slot, could be prestored into the NVRAM. That is, the writing into memory of enclosure and backplane location information would be done only once at the time of system manufacture and configuration, as with the slot information.

On the other hand, where system configuration could be relatively dynamic, random access memory (RAM) may be the best choice for storing of enclosure/backplane information. Since according to the invention, this location information can be written relatively quickly at startup or reset, the volatile random access memory associated with the already present bridge circuits was a desirable choice.

Further, according to the illustrated preferred embodiment, the location information is stored in memory disposed on each backplane, and this is considered preferable, that is, having the location information stored in memory on a field replaceable unit, such as a backplane. One reason is that when upgrading of bridge circuits is performed for example, which are located on the backplane, the VPD information, stored in the local memory, needs to be changed as well. Having the memory located on the backplane along with the bridge circuit is therefore more robust for upgrading procedures.

However, the location information could be locally stored in memory at other places in an enclosure within the spirit of the invention, for example, in situations where for one reason or another, backplane space is strictly limited. For example, the respective location information could be stored in memory disposed somewhere in the associated enclosure, but not on the backplane or backplanes, e.g., in the SPCN node itself. Or the respective location information could be stored in memory disposed on one or more of the card devices plugged into the respective slots on a backplane. The operating system could then read out the location information as it polls the devices in the system during IPL. The memory for storing the location information could be provided anywhere within an enclosure so long as there is a coupling to SPCN to write the enclosure/backplane location information, and to the system bus for reading the information. The exact configuration may depend on a variety of technical and/or economic factors, such as cost, complexity, and compatibility with existing hardware. The above described embodiment takes advantage of already existing structures and devices, e.g., the bridge circuits, to implement the invention. Of course, for the previously discussed reasons, providing the memory on the backplane is the preferred implementation of the invention.

Advantageously, due to coupling to both the SPCN and the PCI bus in the illustrated embodiment, there is the ability to access the location information both through SPCN and through the host system (PCI) bus. This can be useful if the PCI bus is unavailable or inoperative, for example, providing a redundant path through which the information can be accessed, i.e., through the SPCN network.

While in the above described embodiment, the location information is disclosed as being written during initialization of the system, the inventive concept is not limited to this scenario. For example, the information could be obtained and written into memory whenever a slot device is added, replaced or removed from a backplane, or whenever an enclosure is added, removed or replaced in the computer system. With the advent of so-called "hot-pluggability" for the PCI bus standard, in which devices or even whole backplanes can be plugged-in and removed while the system is still running, real-time correlation will be needed to retain proper hardware resource information in the operating system. The present invention provides a mechanism to quickly and efficiently serve this need. The operation could be initiated by the system operator or maintenance personnel, or could be set off when a periodic poll by the SPCN network determines a hardware change has been made, for example.

The inventive concept is furthermore not necessarily limited to the enclosure/backplane/slot location situations described above, but could be applied to other system configuration situations as they arise. For example, one could imagine a large computer system with a number of enclosures, where one or more enclosures includes several sub-enclosures, and the desirability of specifying physical location by enclosure, sub-enclosure, backplane and slot.

Figure 2:
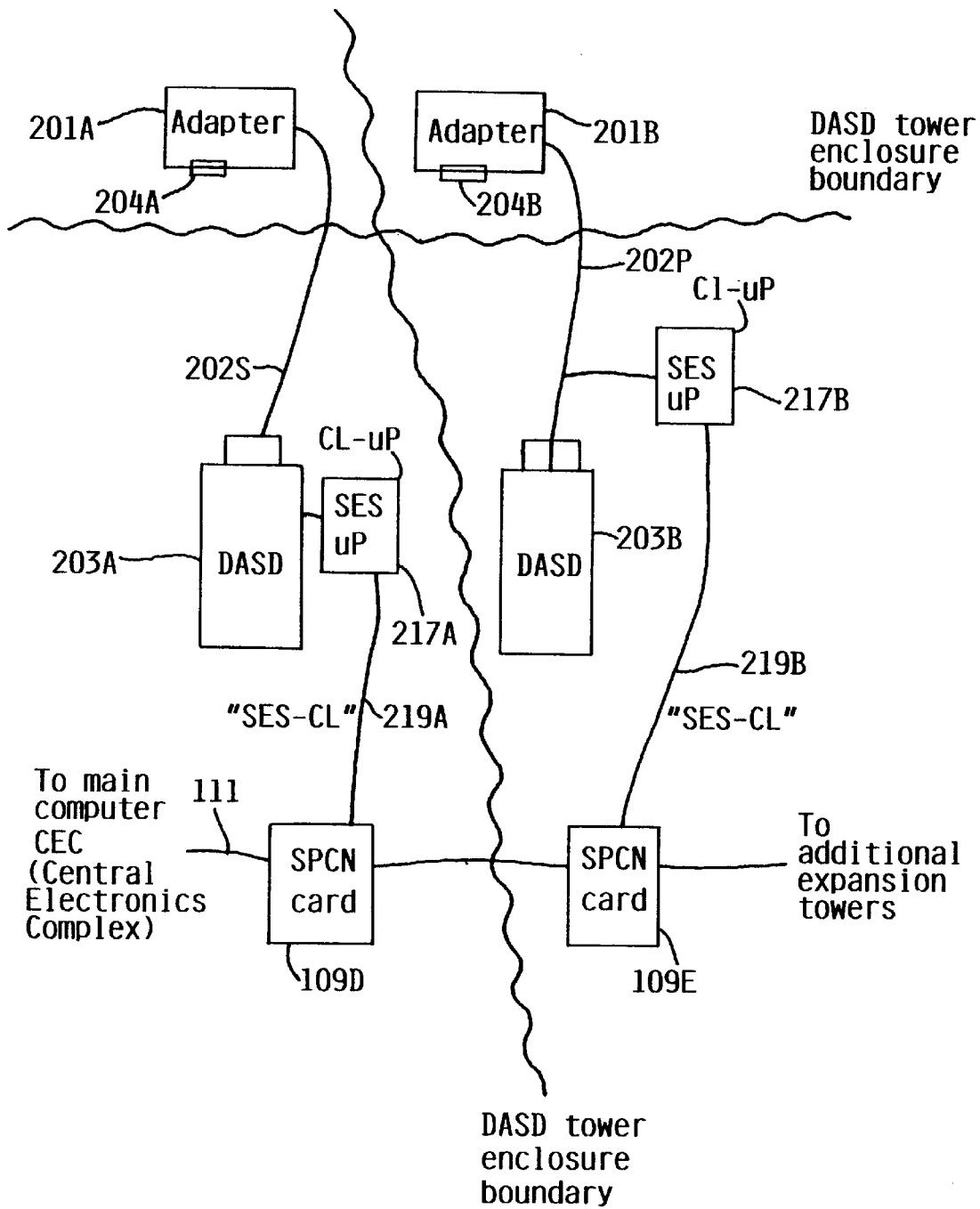
FIG. 2 illustrates a DASD backplane system according to an exemplary embodiment of the invention.

With reference to FIG. 2, another implementation of the invention will now be described, relating to direct access storage devices (DASDs), i.e., hard disk drives and the like. An input/output (I/O) system in a computer typically contains one or more DASDs. The DASDs are usually disposed in shelves or positions within the chassis of either the main computer enclosure (the CEC) or in associated expansion enclosures connected to the main enclosure by, for example, a dedicated DASD serial or parallel bus. In more detail, these DASD devices generally connect to the computer system through adapter cards, which plug-in to a backplane, e.g., a PCI backplane 113, located either in the main enclosure (CEC), or an expansion enclosure. These adapter cards may provide either serial or parallel interface connections to one or more DASD backplanes to which the DASDs are connected, and an implementation for a serial and a parallel interface will be described.

The backplane to which the DASDs are connected may be solely for DASD devices, or may also accommodate other devices, but for purposes of the following description of the DASD implementation, will be referred to as a DASD backplane herein. For purposes of description of this implementation, a description of the details of the typical computer system, e.g., the CEC tower and expansion towers, which are the same as in the previously described PCI bus implementation will be omitted for brevity. As with the I/O devices mentioned in the PCI backplane implementation, it should be apparent that service personnel would also benefit from an indication of the physical location of a DASD needing service in a multi-tower computer system.

As illustrated in FIG. 2, each DASD connection includes a DASD adapter 201A, 201B coupled by a serial 202S or parallel 202P bus to one or more DASDs 203A, 203B through a DASD backplane (not shown). The adapters 201A, 201B are plugged into a respective slot 204A, 204B of a backplane, e.g., a PCI backplane 113. This backplane could be located in the DASD enclosure, or outside the enclosure, i.e., in the CEC and coupled to a DASD backplane over the serial or parallel bus, and the latter location arrangement is represented in FIG. 2 by the DASD enclosure boundary lines. A respective systems enclosure services processor (SES) 217A, 217B is also provided connected to the respective DASDs in the serial case, or directly to the parallel 202P bus in the parallel case. Preferably, the SES would be disposed on the DASD backplane, however, as in the case of the previously described PCI backplane bridge circuit, other locations are considered to be within the spirit of the invention.

Previously, the SES processors have been provided to perform other functions than those related to the present invention, such as to monitor and/or control power and cooling parameters. While only one DASD and one associated SES are illustrated in the respective serial and parallel implementations of FIG. 2, it should be understood that the implementation is not so limited, and this is done only to simplify the description and illustration.

The serial 202S and parallel 202P buses connect the respective adapted card to a DASD backplane to which the DASDs are connected. The buses 202S and 202P may be any of a number of standard peripheral buses, for example, an SCSI (Small Computer Systems Interface) bus which is often used with DASD peripheral devices. The SES processors 217A, 217B provided in the respective DASD enclosures, preferably on the respective DASD backplane, include a respective link to the SPCN network node 109D, 109E, i.e., the SES-CL (SES concentrator link) 219A, 219B. As in the previously described PCI backplane embodiment, each enclosure contains at least one respective SPCN node 109D, 109E coupled to the CEC (not shown) by the SPCN line 111. Therefore, the links 219A, 219B couple the SES processors 217A, 217B to the respective SPCN node 109D, 109E.

In this embodiment, the SES processors 217A, 217B include memory into and from which SPCN can write and read location information, i.e., the particular slot/backplane/enclosure of each DASD, in a manner similar to that described above with respect to the PCI backplane implementation of FIG. 1, for use by the operating system in correlating logical address to actual physical location in the system.

Therefore, a detailed description thereof is not necessary for a complete understanding of this implementation of the invention.

Since the backplane (e.g., PCI) and the adapter connected thereto may be located outside of the enclosure in which a DASD backplane and the DASDs are located, the adapter may have a different enclosure address from the DASD backplane. It may be advantageous to service personnel, for example, to know not only the enclosure, backplane and DASD backplane slot to which the associated DASD is connected, but also the shelf on which the particular DASD device is located in an external DASD enclosure. Therefore, within the spirit of the invention, this information could also be stored independently, or inherently in the other stored information. For example, a wiring convention could be followed such that slot one on the backplane was always used to connect to a DASD on shelf one in a DASD enclosure. The invention is thus adaptable to storing any location information to suit a particular enclosure environment.

Figure 3A:
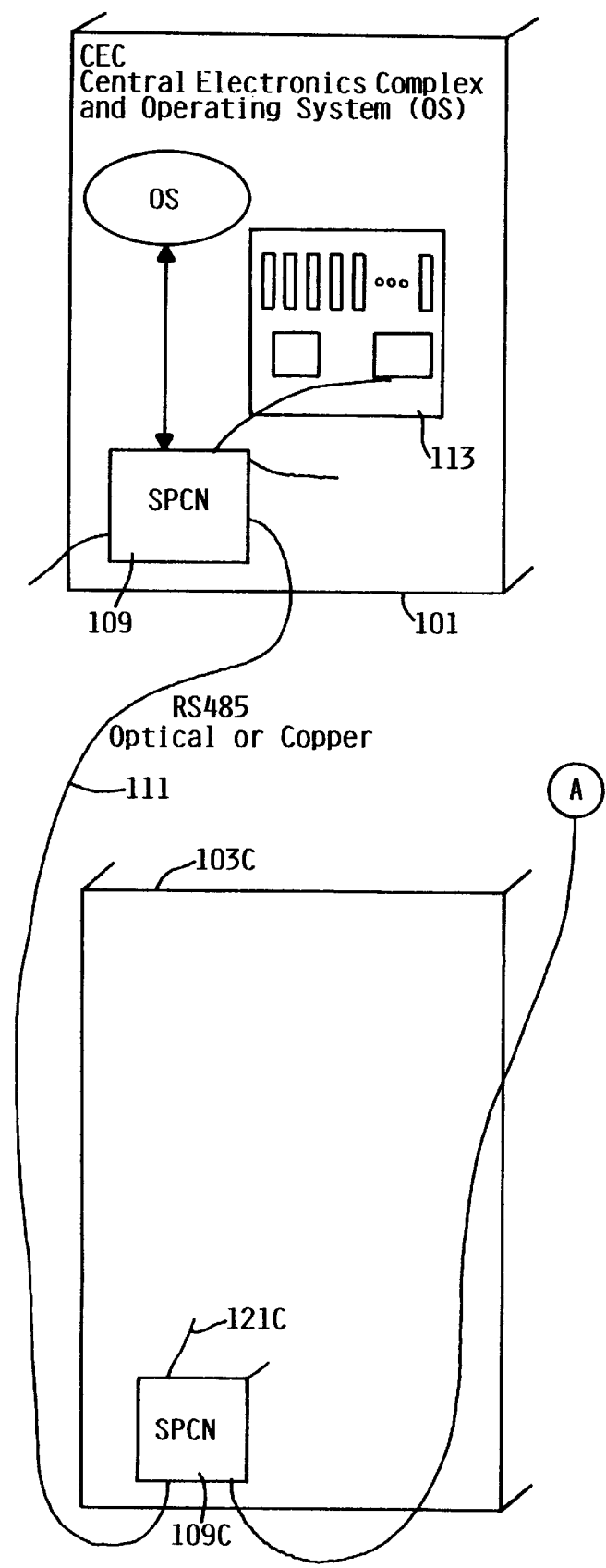
FIG. 3 illustrates a clustered system of CECs and towers having both PCI and DASD backplanes in one enclosure according to an exemplary embodiment of the invention.
Figure 3B:
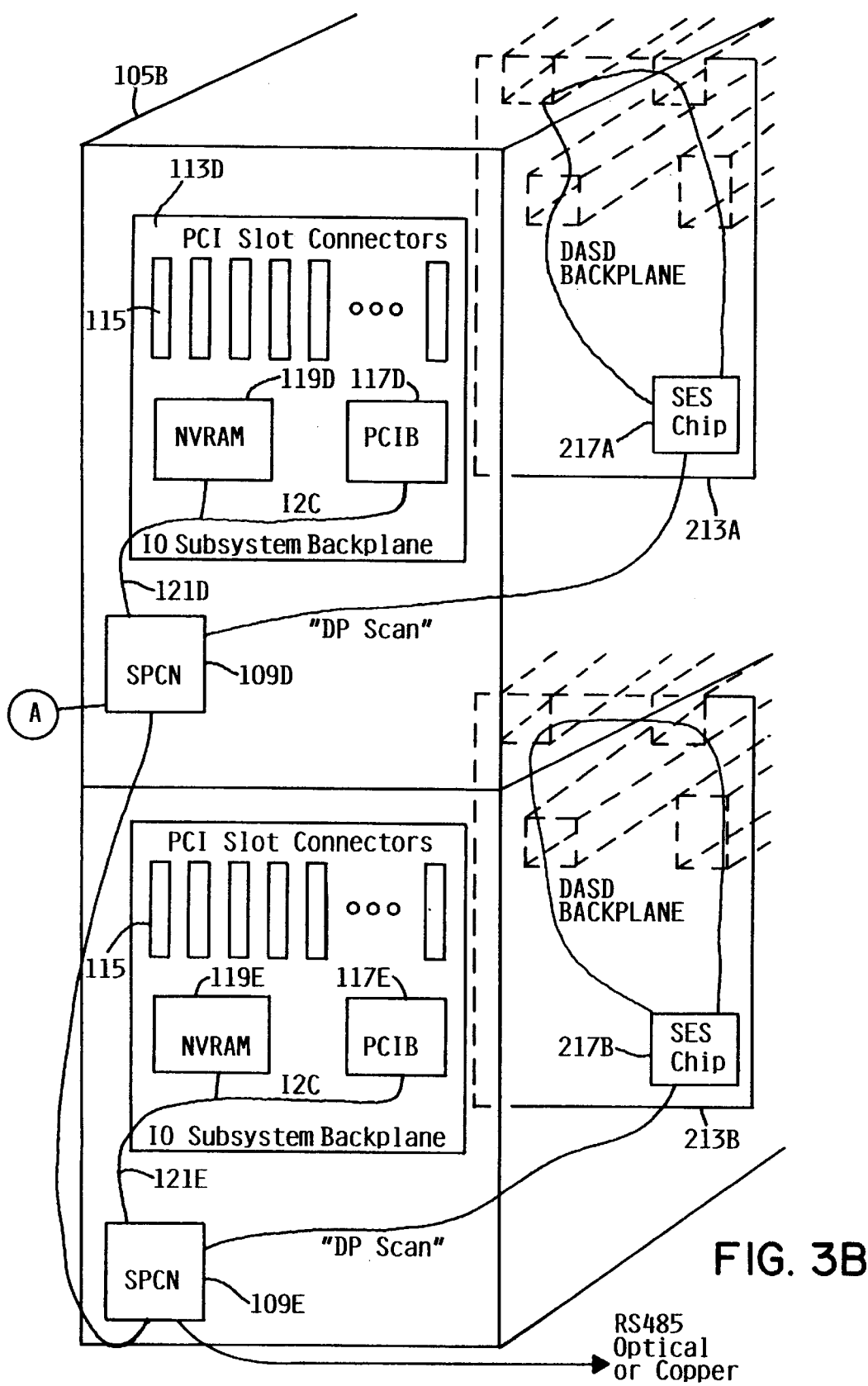

Although FIG. 2 illustrates the adapter cards 201A, 201B coupled in (PCI) backplane slots 204A, 204B outside of the DASD tower enclosure boundary, the invention is not so limited. FIG. 3 shows a configuration where the (PCI) backplane 113D which would receive the adapter cards for the DASDs are within the same tower enclosure boundary as the DASD backplane 213A and DASDs. The SES processor 217A is located on the DASD backplane 213A.

As with the previously described embodiment of FIG. 1, the memory used by SPCN to store location information could be of a variety of types and could be placed in a location other than in the system enclosure services processors (SES) in question, within the spirit of the invention.

This DASD implementation has been described as using the SES processor and its memory as a convenient device for holding the location information, however, the invention is not limited to these particulars. An underlying concept of the invention is that there is a link with SPCN permitting an efficient and accurate storing of location information, which the operating system can access through its logical addressing over the serial or parallel bus 202S, 202P, respectively, to build a correlation between logical DASD and physical location.

Further, it is reiterated that an underlying concept is that there is a redundant path to the information, e.g., the normal functional path and the SPCN in the described exemplary embodiments. This is advantageous because, should the normal functional path fail, the redundant path can still provide information to the operating system, and therefore to service personnel, about what happened and where. Without this redundant path, when the functional path fails, such information cannot be displayed.

The SES-CL link 219A, 219B between the SPCN node card 109D, 109E could be a serial or parallel link. A serial link over an 12C standard bus as described with respect to FIG. 1, an RS232 serial link, or any other standard serial connection would be adequate for the purposes of the invention.

As mentioned above, an enclosure could contain both PCI backplanes and DASD backplanes, and an example of such an enclosure is shown in FIG. 3. FIG. 3 illustrates a so-called "clustered system," that is, a system having multiple CECs (central electronics enclosures) and which share I/O and DASDs. Such a system is provided for fault tolerance, for example. Should a primary CEC fail, a hot standby CEC can be brought on-line. A third CEC may be provided as a backup for the standby now on-line. Since in such a system, the CECs would share input/output (e.g., PCI slots) and direct access storage devices (DASDs), they will also share the logical to physical mapping information about these facilities.

The CEC/OS enclosure 101 is as previously described, having a backplane 113, and an SPCN node 109 which is coupled to the rest of the enclosures in the system via line 111, and respective nodes 109C, 109D, 109E in other enclosures. The SPCN network may be in the form of a loop, or one or more chains, as previously mentioned. Enclosure 103C represents a redundant CEC enclosure such as previously described, having an SPCN node 109C.

With reference to the stacked enclosures 105B, a respective SPCN node processor 109D, 109E is provided in each of the stacked enclosures. Each of the stacked enclosures 105B further has a plurality of backplanes, both of the PCI type 113D, 113E, and of the DASD type 213A, 213B, and the associated circuitry for carrying out an embodiment of the invention, as previously described.

Figure 4A:
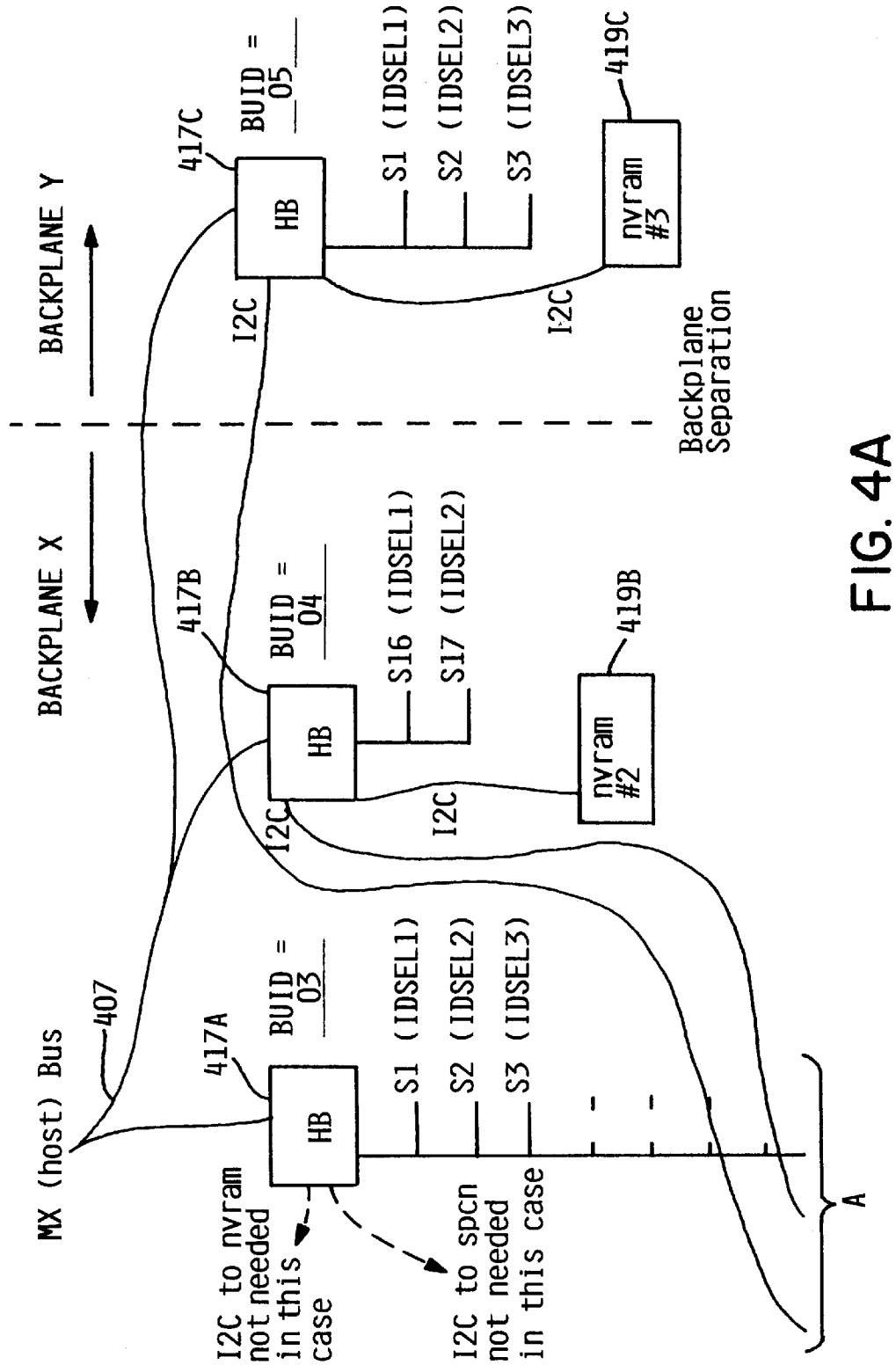
FIG. 4 illustrates a two backplanes example of card slot architecture according to an exemplary embodiment of the invention.
Figure 4B:
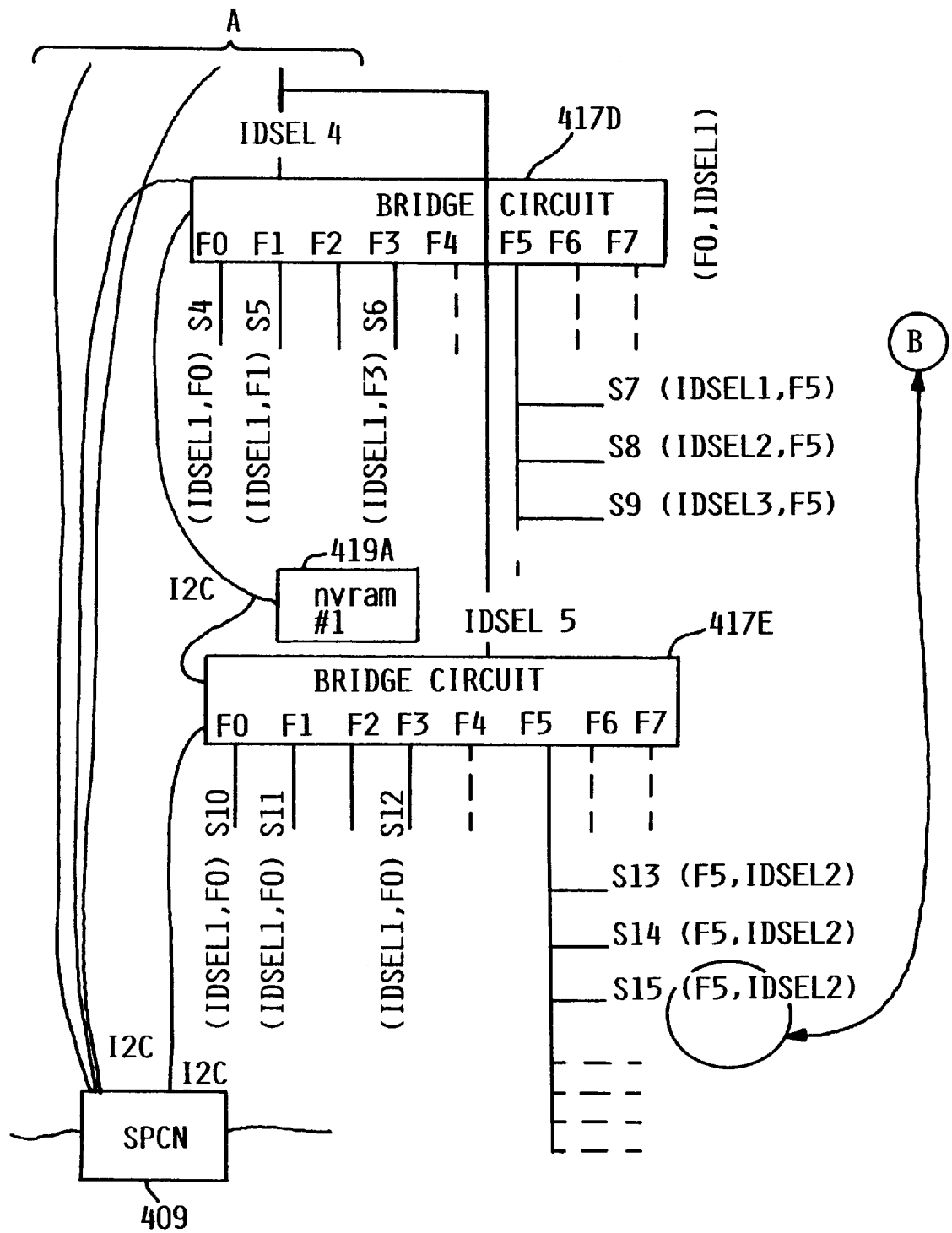
Figure 4C:
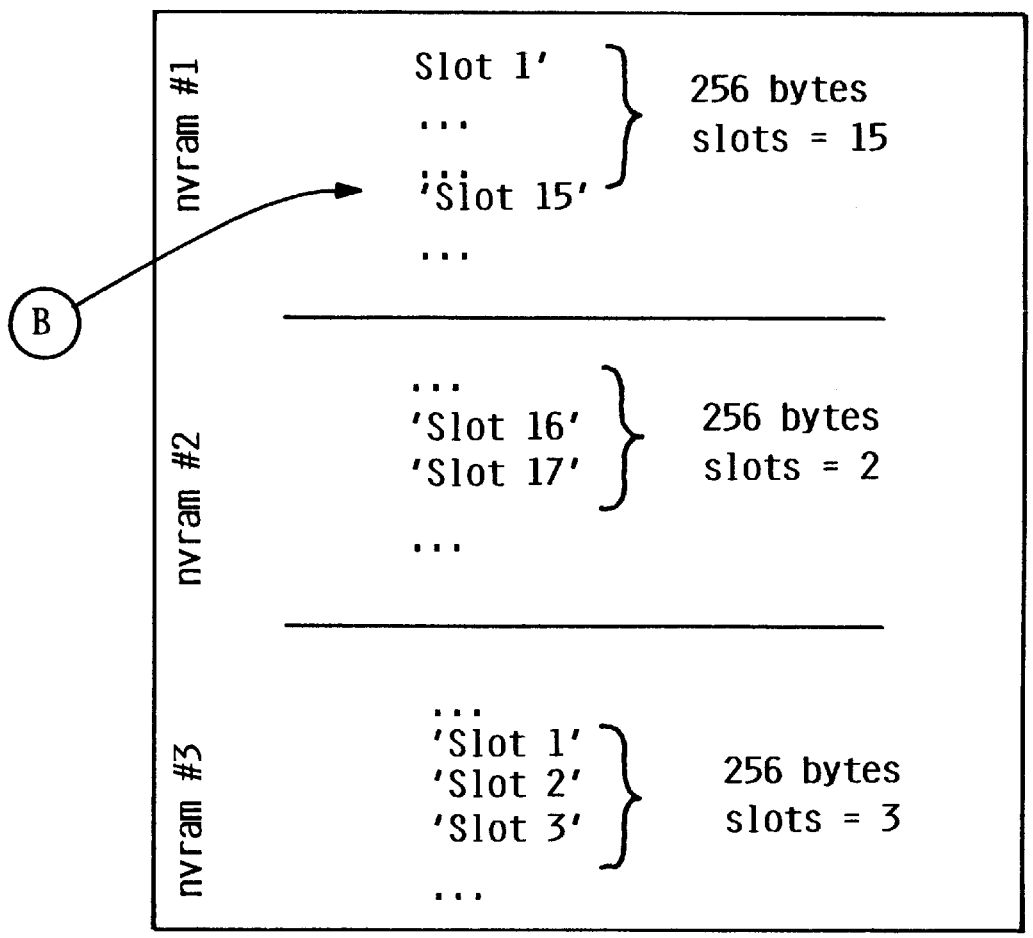

FIG. 4 illustrates a two backplanes example of card slot architecture according to an exemplary embodiment of the invention, showing various connections of bridge circuits. In particular, host bridge circuit 417A is coupled to the host system (e.g., PCI) bus 407, and also to two other bridge circuits 417D, 417E through IDSEL lines. Host bridge 417A does not need to be connected to NVRAM or to the SPCN node 409, since bridge circuits 417D and 417E already are coupled to NVRAM 419A and the node 409. Host bridge 417B, on the other hand, has associated NVRAM 419B and a connection to the node 409. These bridge circuits are on backplane X. On backplane Y, a host bridge circuit 417C is disposed, with associated NVRAM 419C, and a connection to the same SPCN node 409. The box insert represents how the card slot information could be stored in the respective NVRAMs 419A, 419B, 419C, for example.

FIG. 5 is a table illustrating one way backplane information could be stored an exemplary embodiment of an NVRAM according to the invention. The NVRAM format provides two 128 byte portions. The top portion contains "manufacturing" information including CCIN (card component identification number, i.e., type of backplane), status (i.e., model number), part number, and MFG ID (e.g., manufacturing plant identification). Space is reserved (RSVD) for a serial number, however, as indicated in the comments column (far right) if this is to be used, the memory cannot be programmed in groups ("gang burned") but must be done individually. Where not used, it would be filled with FFH, for example.

The frame identification and the backplane identification bytes would generally only be used in systems with a fixed configuration that do not have the SPCN 12C connection, described above. Systems having the 12C connection would write these bytes to the bridge circuit during IPL, as already described. The operating system will always check the bridge circuit for non-zero frame identification and backplane identification entries, and use them as defaults, i.e., these bytes in NVRAM will be ignored. Therefore, writing these bytes in NVRAM during manufacturing is optional for systems with an SPCN 12C connection.

The slot count indicates how many slots to look for in the following slot map, since a peripheral component interconnect (PCI) backplane may be configured for 16 slots or more, and when reading the NVRAM information, the system needs to know where the slot map information ends. In this implementation, 5 bytes are used for each slot. If there were 16 slots, the slot count would be 16, and there would be 16*5 bytes in the slot map.

Following the slot map are some reserved bytes for storing, for example, configuration information to differentiate systems where identical backplanes are used, and to provide room for future use.

In the operating system (OP SYS) section, a system serial number and an operating system assigned serial number are provided. Following this there are provided a primary bus logical bus number and a primary bus physical number, as well as a sub-bus logical bus number and sub-bus card number. Typically, a multi-enclosure (multi-tower) system is interconnected by a high-speed system bus in a loop or point-to-point configuration. At each enclosure (tower) there is a bus "drop," and each bus drop is given a number stored in NVRAM. The bus drop number stored in NVRAM is used to correlate the bus drop to the logical address. In this way, from IPL to IPL, or even during concurrent maintenance, a system enclosure (tower) may be re-attached in a different physical position on the system bus, or removed completely. The bus identification in NVRAM can be used advantageously to correlate a moved tower to a possibly new logical identification.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

What is claimed is:

1. In an electronic system having a system bus and a separate system power control network, the system bus and the system power control network being separately connected to at least one enclosure including at least one connecting board with at least one associated device coupled thereto, a method comprising:

electronically determining a respective physical location for the at least one associated device; and storing an indication of the electronically determined respective physical location in memory disposed in the at least one enclosure;

wherein the system power control network performs the determining of the respective physical location and the storing of the indication thereof in the respective memory.

2. The method according to claim 1, further comprising storing device information along with the physical location indication in the memory.

3. The method according to claim 2, further comprising building a connecting board slot map, wherein the stored physical location information includes the connecting board slot map.

4. The method according to claim 2, wherein each device has a logical address, and wherein the method further comprises building a logical address to physical location table.

5. The method according to claim 1, wherein the electronic system includes a plurality of enclosures, each enclosure having at least one associated connecting board disposed therein with at least one associated device coupled thereto, and wherein the method further comprises, with the system power control network:

electronically determining a respective physical enclosure location for each associated connecting board; and storing an indication of each respective physical enclosure location in memory disposed in the associated enclosure.

6. The method according to claim 5, further comprising:

assigning a unique logical address for each device of the electronic system, a logical address being an address through which the electronic system communicates with an associated device; and correlating each logical address to each respective physical location for each device using the stored indication of the respective physical location.

7. The method according to claim 6, wherein the plurality of devices comprise field replaceable units, and wherein the method further comprises:

detecting an operating condition of a field replaceable unit; and displaying the physical location of a field replaceable unit having a substandard operating condition using the correlation of logical address to respective physical location.

8. The method according to claim 7, wherein the displaying comprises displaying the physical location on a local operator panel display at the enclosure.

9. The method according to claim 8, wherein the displaying further comprises displaying an error code alternatingly with displaying the physical location.

10. The method according to claim 1, wherein the connecting board comprises a backplane having at least one slot thereon, and wherein the determining a physical location includes determining a location of the at least one backplane.

11. The method according to claim 10, wherein the electronic system is a computer system having at least one enclosure, each enclosure having at least one backplane, each backplane having at least one slot for receiving a device therein;

wherein the determining a physical location includes assigning an enclosure location indication for each enclosure, and assigning a backplane location indication for each backplane; and wherein the storing each respective physical location in memory disposed at the at least one backplane comprises storing the associated enclosure location indication and the associated backplane location indication in the respective memory.

12. The method according to claim 11, wherein the at least one backplane comprises at least one of:

a peripheral component interconnect backplane having non-volatile memory thereon which stores slot information, wherein the determining a physical location includes determining a slot number on the peripheral component interconnect backplane; and a direct access storage device backplane, wherein the determining a physical location includes determining a slot number on the direct access storage device backplane.

13. The method according to claim 12, wherein the peripheral component interconnect backplane includes at least one bridge circuit, the at least one bridge circuit including the memory in which the location information is stored, and wherein the bridge circuit accesses the non-volatile memory to provide the slot information to the computer system.

14. The method according to claim 11, wherein the at least one backplane comprises a direct access storage device backplane having at least one direct access storage device coupled to a slot thereon, wherein the determining a physical location includes determining a slot number on the direct access storage device backplane where the at least one direct access storage device is coupled.

15. The method according to claim 11, wherein the at least one backplane comprises a first and second backplane disposed in different enclosures, wherein the first backplane has at least one direct access storage device adapter card coupled thereto, the second backplane being coupled to the at least one direct access storage device adapter card by a bus, wherein the second backplane comprises a direct access storage device backplane to which at least one direct access storage device is coupled, and wherein the determining a physical location includes:

determining a slot number on the direct access storage device backplane where the at least one direct access storage device is coupled;

determining a backplane number having the slot to which the direct access storage device backplane is coupled; and determining an enclosure number in which the direct access storage device backplane is located.

16. The method according to claim 11, wherein each backplane includes interface circuitry for interfacing with the memory storing the location information, and for interfacing with the system power control network, and wherein the system power control network performs the determining of the respective physical location and the storing of the indication thereof in the respective memory through the interface circuitry.

17. The method according to claim 1, further comprising:

assigning a unique logical address for each device of the electronic system, a logical address being an address through which the electronic system communicates with an associated device; and correlating each logical address to each respective physical location for each device.

18. The method according to claim 1, wherein the memory is non-volatile memory, and wherein there are a plurality of enclosures interconnected by a system bus with bus drops at the enclosures, the method further comprising:

storing system bus drop information in the non-volatile memory.

19. In an electronic system having at least one enclosure, each enclosure having at least one associated backplane with at least one device coupled thereto, an apparatus comprising:

determining means for electronically determining a respective physical location of each enclosure, backplane and device;

storing means for storing an indication of each respective physical location, the storing means being disposed in an associated enclosure;

assigning means for assigning a unique logical address for each enclosure, backplane and device of the electronic system, a logical address being an address through which the electronic system communicates with an associated enclosure, backplane and device; and correlating means for correlating each logical address to each respective physical location for each enclosure, backplane and device.

20. In an electronic system having a central electronics complex, a system bus, and a system power control network interconnecting a plurality of enclosures, the enclosures having at least one backplane with at least one local bus and at least one slot for coupling a device thereto, a device mapping apparatus comprising:

non-volatile memory disposed on the at least one backplane, the non-volatile memory being prestored with slot location information; and a bus bridge circuit, disposed on the at least one backplane, the bus bridge circuit being coupled to the non-volatile memory, coupled to the at least one local bus, coupled to the system power control network, and coupled to the system bus, the bus bridge circuit having volatile memory associated therewith for storing location information;

wherein the system power control network determines and writes into the volatile memory, enclosure and backplane location information; and wherein the central electronic complex obtains the slot location information of each non-volatile memory through the system bus from each bus bridge circuit, obtains enclosure and backplane location information of each volatile memory through the system bus from each bus bridge circuit, and correlates the enclosure, backplane and slot location information with logical addresses for each respective device.

21. In an electronic system having a system power control network interconnecting nodes in a plurality of enclosures, the system having at least one direct access storage device backplane with at least one slot for coupling a direct access storage device thereto and at least one peripheral device backplane for coupling a direct access storage device adapter thereto, the direct access storage device adapter coupled to the at least one direct access storage device backplane by a communications medium, a device mapping apparatus comprising:

memory associated with the at least one direct access storage device, for storing physical location information; and linking means for linking the memory to an associated network node;

wherein the system power control network determines and writes the physical location information into the memory through the linking means; and wherein the electronic system correlates the location information with each logical address of each respective direct access storage device.

22. In an electronic system having at least one central electronics complex in at least one enclosure, each enclosure having at least one associated backplane for coupling at least one device thereto, an apparatus comprising:

memory associated with the at least one backplane for storing location information used to correlate physical location with logical address;

a primary functional path from the at least one central electronic complex to the memory associated with the at least one backplane, for reading or writing the location information; and a second path from the at least one central electronic complex to the memory associated with the at least one backplane, for writing the location information into the memory or reading the location information from the memory.

23. The apparatus according to claim 22, wherein the at least one central electronics complex comprises a primary central electronics complex and at least one backup central electronics complex; and wherein the primary and the at least one secondary central electronics complexes share access to the location information in the memory.

24. The apparatus according to claim 23, wherein the primary functional path comprises a system bus, and wherein the second path comprises a control network.

25. The apparatus according to claim 24, wherein the control network comprises a serial network.

26. The apparatus according to claim 24, wherein the at least one backup central electronics complex comprises a first backup central electronics complex and a second backup central electronics complex, wherein the first and second backup central electronics complexes share the location information with the primary central electronics complex.

27. A method of correlating physical location to logical address utilizing the apparatus according to claim 24, comprising:

prior to an initial program load, storing the location information into the memory using the second path;

during the initial program load, reading the stored location information from the memory using the primary functional path, and correlating logical addresses to physical location using the read location information.

28. An apparatus comprising:

a first computer system enclosure and at least one second computer system enclosure;

a central electronics complex disposed in the first computer system enclosure;

a host system bus providing a primary functional path between the first computer system enclosure and the at least one second computer system enclosure for data and instruction transfers;

at least one respective input/output subsystem disposed in the at least one second computer system enclosure, the respective input/output subsystem being at least one of:

a peripheral component interconnect backplane having bus slots for receiving input/output device adapter cards therein, non-volatile memory for storing slot location information therein, and at least one bridge circuit provided with memory, for interfacing the bus slots to the host system bus, the non-volatile memory being coupled to the bridge circuit by a separate local bus; or a direct access storage device backplane having a plurality of couplings for connecting to respective direct access storage devices, there being at least one services enclosure processor associated with the direct access storage devices having memory for storing location information therein, and a respective services link coupled to the at least one services enclosure processor;

a system power control network, having a first node disposed in the first computer system enclosure, and having a respective second node disposed in the respective at least one second computer system enclosure, the first and second nodes being interconnected by a serial communications medium;

wherein, in the case of the peripheral component interconnect backplane, the respective second node is coupled to the respective bridge circuit by the respective separate local bus, the non-volatile memory is prestored with the slot location information during manufacture of the backplane, and prior to initial program load, the system power control network determines location information for each bus slot input/output device adapter card by writing to the bridge circuit memory;

wherein, in the case of the direct access storage device backplane, the respective second node is coupled to the respective services enclosure processor memory by the services link, and prior to initial program load, the system power control network determines location information for each direct access storage device by writing to the services enclosure processor memory;

wherein during initial program load, the central electronics complex defines logical addresses for every component of the system over the host system bus, reads the location information stored in the respective memories, and correlates logical addresses to physical location based on the read location information; and wherein the location information includes at least slot, backplane and enclosure information.

* * * * *